United States Patent [19]
Messner

[11] 3,905,181
[45] Sept. 16, 1975

[54] LAWN MAINTENANCE EQUIPMENT
[76] Inventor: Carlton E. Messner, 1445 Randolph, Muskegon, Mich. 49441
[22] Filed: Feb. 4, 1974
[21] Appl. No.: 439,385

[52] U.S. Cl. ............ 56/13.1; 56/13.4; 56/16.9; 56/320.2
[51] Int. Cl.² .................................. A01D 35/262
[58] Field of Search ......... 56/13.4, 12.8, 12.9, 13.1, 56/16.9, 17.4, 17.5, 255, 320.2, 202

[56] References Cited
UNITED STATES PATENTS

| | | | |
|---|---|---|---|
| 2,737,003 | 3/1956 | Beers | 56/13.4 X |
| 2,779,146 | 1/1957 | Mitchell et al. | 56/13.4 |
| 3,002,331 | 10/1961 | Denney | 56/13.4 |
| 3,157,015 | 11/1964 | Russell et al. | 56/13.4 X |
| 3,541,771 | 11/1970 | Schulze | 56/320.2 X |
| 3,618,157 | 11/1971 | Bassin | 56/202 X |
| 3,696,595 | 10/1972 | Dahl | 56/16.9 |

FOREIGN PATENTS OR APPLICATIONS
264,584  4/1964  Australia ............................ 56/13.4

Primary Examiner—J. N. Eskovitz
Attorney, Agent, or Firm—Gifford, Chandler & Sheridan

[57] ABSTRACT

A rotary lawn mower with various interchangeable parts can be utilized not only as a standard lawn mower but also a vegetation chopper or shredder, a leaf blower or a snow blower. A vacuum attachment is also provided to permit inaccessible areas to be maintained.

19 Claims, 11 Drawing Figures

PATENTED SEP 16 1975 3,905,181

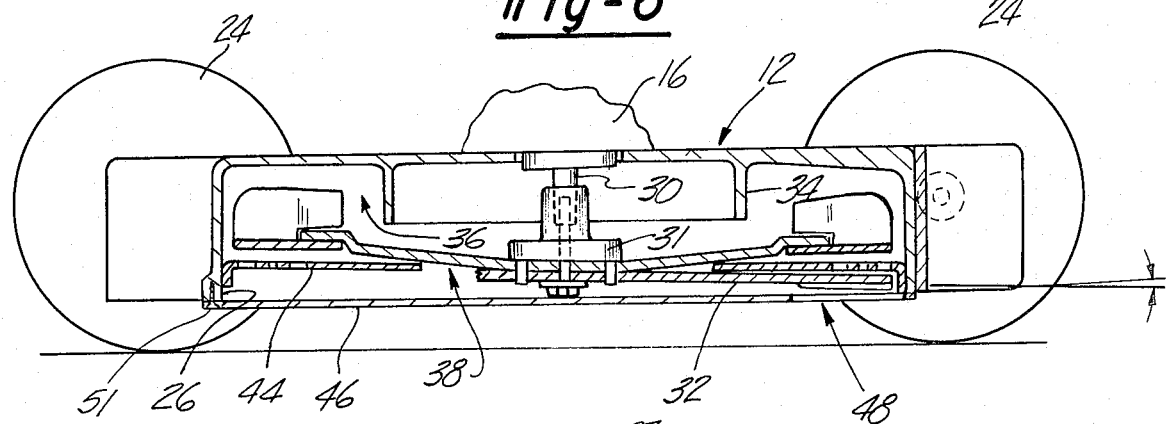
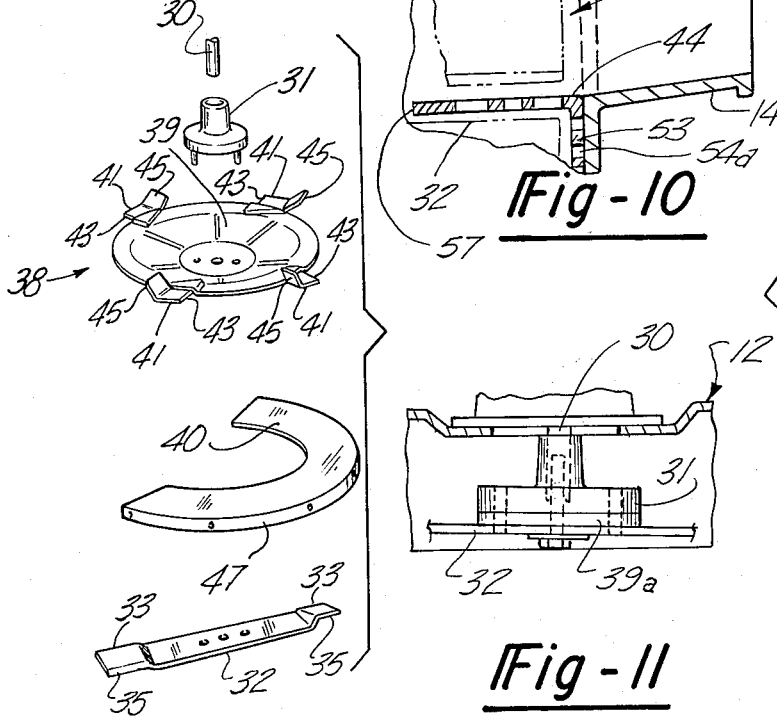
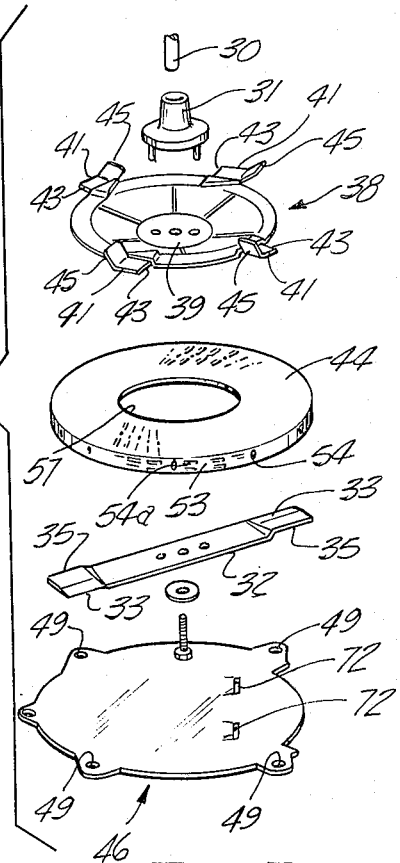
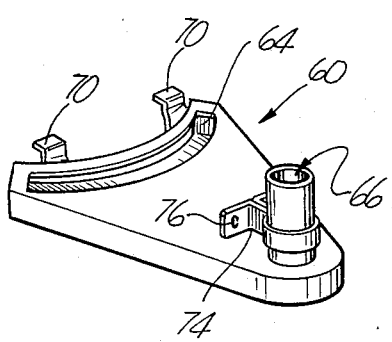

LAWN MAINTENANCE EQUIPMENT

BACKGROUND OF THE INVENTION

I. Field of the Invention

The present invention relates to lawn maintenance equipment and more particularly to such equipment which can be used not only to cut the lawn but which can also be used as a leaf shredder or blower as well as a snow blower.

II. Description of the Prior Art

There are known lawn maintenance devices which include means for vegetation shredding or mulching. Some of these devices are single purpose devices used solely for gathering and shredding vegetation refuse from the ground. Others are attached to rotary-type lawn mowers to shred grass as it is cut from the lawn.

A major drawback with single purpose shredders is that two machines are required for adequate lawn care; a lawn mower and a shredder. For this reason, the single purpose shredders are too expensive for the individual householder and find their greatest use by commercial businesses.

The shredding and mulching devices attached to rotary-type lawn mowers are of various configurations. Some of these devices have a shredding blade or element which replaces the lawn mower cutting blade. Thus, if leaves are to be mulched, the cutting blade is replaced by the shredder blade and the lawn gone over to pickup and shred the leaves.

Others of these devices incorporate a shredding or mulching element in addition to the lawn cutting blade. However, either because of inadequate chopping of the particles or poorly controlled movement of the particles, they do not perform an adequate shredding action on the vegetation and tend to become clogged.

None of these heretofore known devices can be used to perform a number of different tasks such as vegetation shredding and/or chopping, leaf or snow blowing and vacuum cleaning.

Therefore, a need exists for an inexpensive, lawn maintenance device for rotary-type lawn mowers which can be used to perform a number of lawn maintenance functions.

SUMMARY OF THE INVENTION

The present invention provides inexpensive lawn maintenance equipment which includes means to be removably attached to a rotary-type lawn mower and which, for example, gathers grass cuttings as they are being cut from the lawn, as well as gathering other plant refuse such as leaves, and chops them into relatively small particles. An additional attachment provides for shredding the plant refuse.

The equipment includes a uniquely designed fan blade which produces a very high suction force. This permits the use of the mower as either a leaf blower or in the winter months as a snow blower.

The present invention while it can be used by modifying a standard rotary mower also contemplates for best efficiency a rotary mower having a housing utilizing an improved design.

The lawn mower consists of a basic housing with a circular external enclosure around the cutting blade. The lower part of the housing is machined on the inside diameter for attaching a semi-circular or a circular baffle for the vegetation shredder applications. The tangential discharge opening in the housing is located above the axial flow type cutting blade providing an enclosure on the entire circumference of the blade for maxiumum air flow efficiency.

The depth of the housing is ample for installataion of a fan in the upper part of the housing to increase the air flow for the various applications where required. A circular drum, sized in relation to the inside diameter of the fan blades is bolted or cast underneath the top deck of the housing to confine the air flow from the cutting blade and the fan to the outer portion of the housing and to prevent any air re-circulation. Close blade and fan clearance is provided on all surfaces to prevent clogging of wet or dry material.

The standard lawn mower uses the basic housing and a spacer to position the cutting blade at the correct height in the housing for the normal grass cutting operation.

To use the equipment to cut and chop vegetation, the spacer is removed from the standard lawn mower configuration and the fan is installed.

The equipment can be used as a vegetation shredder by installing a plain horizontal baffle between the cutting blade and the fan at the forward portion of the mower. This baffle retains the material in the lower part of the mower until it passes the discharge chute thus requiring it to make a complete cycle in the upper part of the housing to enable the fan blades to chop it up into smaller particles.

A second baffle in the form of a circular perforated horizontal plate can be used in place of the first baffle to produce even finer shredding of the vegetation.

The equipment also includes a vacuum attachment used to clean refuse from areas inaccessible to the mower; the attachment comprising a diverging nozzle, removably attached to the mower over a small open portion in the housing skirt below the horizontal baffle; a converging nozzle; and a flexible hose operatively interconnecting the nozzles.

By eliminating the bag which normally collects the matter discharged from the mower and utilizing the fan the device can be used as a leaf blower. The device can be used as an inexpensive snow blower by removing a spacer above the cutting blade in the standard lawn mower arrangement and installing the fan.

An important feature of the invention involves a unique control of air flow through the mower in a manner to insure that substantially all matter to be shredded follows a predetermined pathway from the ground, through cutting and shearing zones, and finally to a discharge chute.

By way of example, in one preferred arrangement, air enters a relatively small bottom opening at the front of the mower and moves upwardly into a zone which is swept by the cutting blade. An initial cutting of grass, for example, is effected by the cutting blade. After passing the cutting blade the air stream is reduced in width to increase the velocity of air flow. This is accomplished by a horizontally positioned baffle disposed across the path of the air stream. The air stream passes next into a zone swept by the fan blades each of which is provided with a leading cutting edge and an upwardly extending curved trailing edge. The air stream in the fan blade zone is generally toroidal in shape and directs the particles which have been further chopped by the fan blades into the discharge chute positioned tangentially to the toroidally moving air.

By the unique use of baffles and the unique control of air flow in the manner described, vegetation cuttings in the plane of the cutting blade, are kept suspended by the rapid air movement. The suspended matter next moves between the cutting blade and the first baffle where it is subjected to a shearing action which is particularly effective in the comminution of leaves. The cuttings move next to the chopping blade area where the speed of air flow is again increased and the air mass takes a generally toroidal shape. The suspended matter in the toroid is subjected to the chopping action of the chopping blade and to a shearing force between the chopping blade and the first baffle. The comminuted material then moves from the zone swept by the chopper blades into a chute positioned tangentially to the zone.

DESCRIPTION OF THE DRAWINGS

A better understanding of the present invention will be had upon reference to the following drawings in which like reference characters refer to like parts throughout the several view and in which:

FIG. 4 is an exploded view of components of the embodiment of the invention shown in FIG. 2 and 3;

FIG. 6 is a view taken along line 6—6 of FIG. 5;

FIG. 7 is an exploded view of components of the embodiment of the invention shown in FIGS. 5 and 6;

FIG. 9 is a perspective view of a component of the vacuum device;

FIG. 10 is a view taken along line 10—10 of FIG. 5; and

FIG. 11 is a fragmentary view of a portion of a preferred arrangement of the present invention.

DETAILED DESCRIPTION OF THE PREFERRED EMBODIMENTS

Figure 1:
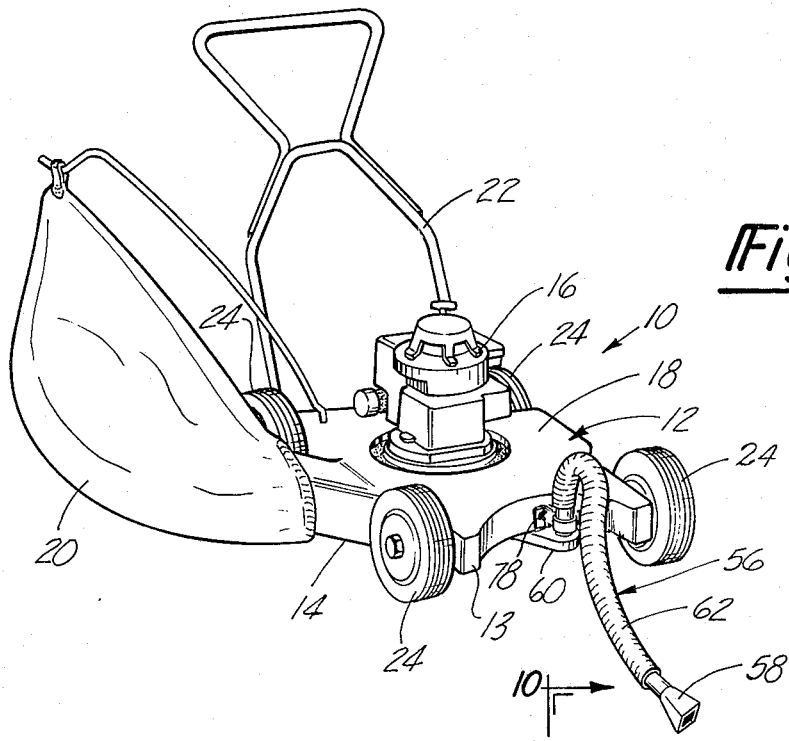
FIG. 1 is a perspective view of a rotary-type lawn mower incorporating the present invention.

Referring now to FIG. 1, there is shown a rotary-type lawn mower 10 comprising a housing 12 having downwardly peripheral side walls 13, a refuse discharge chute 14 connected to the housing 12, a motor 16 attached to a top wall 18 of the housing 12, a refuse collection bag 20 connected to the discharge chute; an operator's handle 22 located at the rear of the mower 10 for pushing and controlling the mower 10 and ground engaging wheels 24.

With reference to FIGS. 2, 3, 5 and 6, the housing 12 includes a cylindrical downwardly extending inner wall 26 forming a cylindrical chamber 28. The chamber 28 is normally open at the bottom. A drive shaft 30 of the motor 16 extends downwardly into and concentrically with the chamber 28.

A cutting blade 32 is disposed within, and sweeps a generally horizontal plane within the chamber 28 with a minimum clearance between the ends of the blade 32 and the circular wall 26 and is secured to the drive shaft 30 for rotation therewith by a crankshaft adaptor 31. This close relationship between the blade 32 and wall 26 prevents material cut by the blade from clogging in the chamber 28. Preferably, the cutting blade 32 is disposed at an angle to the horizontal (see FIG. 6) such that it is approximately one-half inch lower at the front of the mower 10 than it is at the back of the mower 10. The bottom edge of the wall 26 is at approximately the same level above the ground as the cutting blade 32 at the front of the mower 10. As can best be seen in FIGS. 10 and 11, the adaptor 31 positions the blade 32 below the discharge chute 14. This is contrary to most constructions in which the blade and the chute are in the same plane.

As can best be seen in FIGS. 4 and 7, the cutting blade 32 has a leading edge 33 which is the cutting edge, and an upwardly extending curved trailing edge 35 which forces the grass cut by the blade 32 upwardly in the housing 12.

Figure 3:
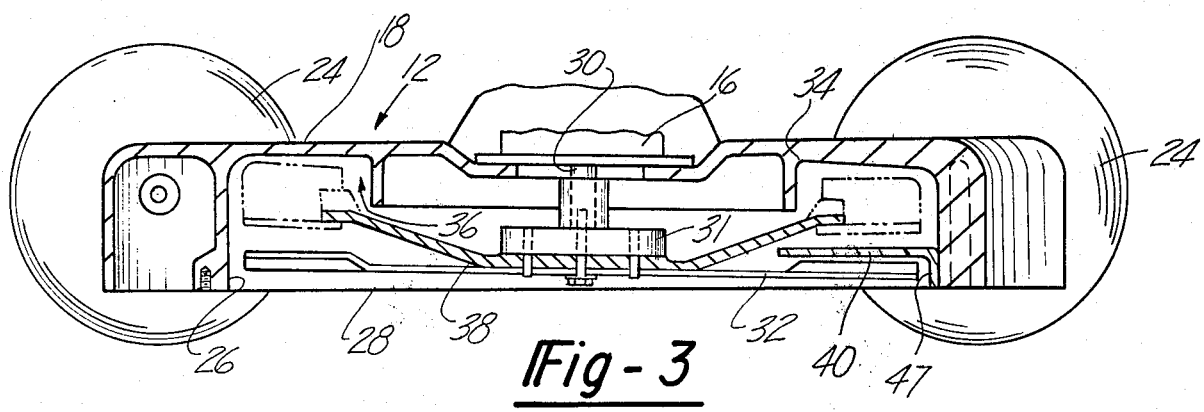
FIG. 3 is a view taken along line 3—3 of FIG. 2.

As best seen in FIGS. 3 and 6, the housing 12 also includes a cylindrical flange 34 concentrically located within the chamber 28 and extending downwardly from the top wall 18. The cylindrical flange 34 cooperates with the circular wall 26 to define an annular chamber 36 therebetween.

The chute 14 is preferably disposed tangentially to the annular chamber 28 to receive air and comminuted vegetation from the generally toroidal shaped air mass which is formed in the chamber 28. The opening 37 into the chute from the chamber 28 is located above the cutting blade 32 as best seen in FIG. 10. This prevents foreign objects from being thrown radially out of the housing and raises the chute 14 above the ground level a sufficient amount so that the refuse bag 20 will not drag on the ground.

With reference to FIG. and 11 the device can be used as a standard lawn mower by utilizing a spacer 39a and the cutting blade 32 mounted to the shaft 30 by the spacer 39a and the adaptor 31.

Figure 2:
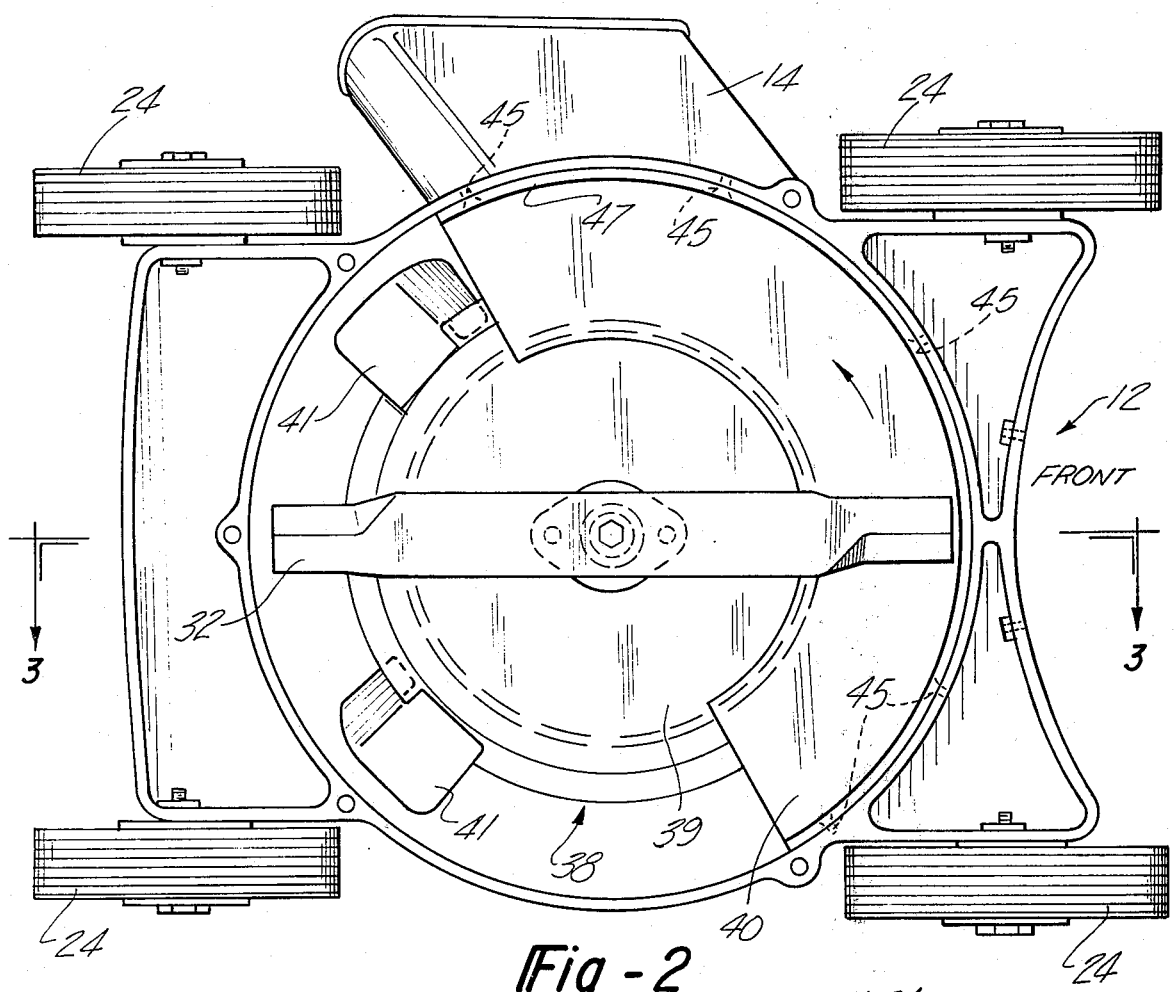
FIG. 2 is a bottom view of the lawn mower of FIG. 1 illustrating a lawn mower of the present invention including the elements necessary to use the equipment for coarse shredding.

Referring to FIGS. 2, 3, and 4 to utilize the device as a coarse vegetation shredder a fan 38 is disposed between the cutting blade 32 and the adaptor 31. A plain horizontal semi-circular baffle 40 is mounted to the housing 12 and disposed intermediate the cutting blade 32 and the fan 38.

The fan 38 comprises a hub 39 and chopping blades 41 connected to and extending radially from the hub 39. The chopping blades 41 sweep a generally horizontal plane and have a leading cutting edge 43 and an upwardly extending curved vane 45 at the trailing edge. The chopping blades 41 may be connected to the hub 39 of the fan 38 by, for example, conventional nuts and bolts (not shown).

The baffle 40 is disposed in a generally horizontal plane between the cutting blade 32 and the fan 38 at the front of the mower 10 to cover a portion of the bottom opening into the cylindrical chamber 28 and with a minimum clearance between the cutting blade 32 and the fan 38. The baffle 40 is removably attached to the housing 12 by a mounting flange 47 and conventional screws 45 (FIG. 2).

The baffle 40 retains the material in the lower part of the mower until it passes the discharge chute 14. This arrangement requires the material to make a complete cycle in the upper part of the housing where the fan blades can have time to chop it up into smaller particles. The baffle 40 also increases the velocity of air flow and provides a shearing force on the vegetation particles between the cutting and fan blades.

Utilizing just the fan 38 and the cutting blade 32 without the baffle 40, the device can be used as a lawn mower and chopper and a snow blower.

Figure 5:
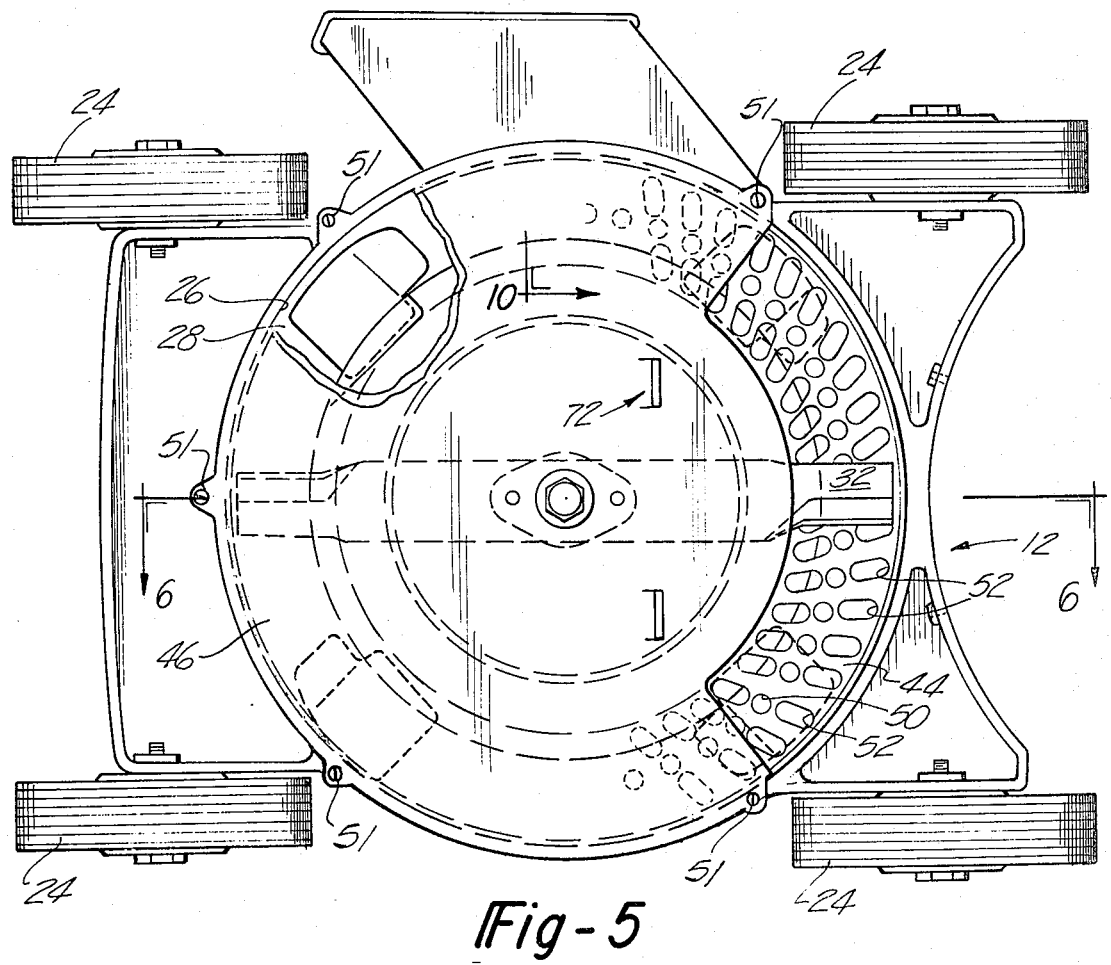
FIG. 5 is a bottom view of the lawn mower of FIG. 1 illustrating the elements necessary to use the equipment for fine shredding.

FIGS. 5, 6 and 7 illustrate the equipment modified to provide fine shredding. A stationary annular plate 44 with perforated holes and slots in the outer area, swept by the cutting and fan blades is disposed coaxially in the cylindrical chamber 28 in a generally horizontal plane between the cutting blade 32 and the fan 38. A stationary plate 46 is connected to the bottom of housing 12 in a generally horizontal plane beneath the cutting blade 32 and closes the rear portion of the bottom opening into the cylindrical chamber 28. The plate 46 reduces the bottom opening to an aperture 48 located at the front of the housing 12. The plate 46 is removably connected to the housing 12, by, for example, attachment ears 49 and screws 51.

As can best be seen in FIG. 5, the annular screen or perforated plate 44 is formed of a combination of round holes 50 and oblong holes 52 to accommodate different shapes and sizes of particles of refuse to be shredded. The annular screen 44 includes a central clearance opening 51 (FIG. 7) for the drive shaft 30 and the adaptor 31, and a perforated peripheral flange 53 having a series of mounting holes 54. The annular screen 44 is connected to the housing 12, by, for example, screws (not shown) which extend through the holes 54 into the housing 12. The annular screen 44 is disposed in the cylindrical chamber 28 between the cutting blade 32 and the fan 38 and below the opening 37 with a minimum clearance between it, the cutting blade 32 and the fan 38. The hub 39 of the fan effectively closes the central clearance opening 51 to prevent air recirculation.

The perforated slots 54a in the flange 53 which surround the cutting blade 32 play an important part in breaking up the material due to the close clearance and the centrifugal force of the material as it is swept in a torroidal movement of air by the cutting blade 32 past the slots. The angle of the cutting blade and the radius at the trailing edge, force the material upward through the perforated plate by an abrasive rubbing action.

The fan blades lift the material by suction and discharge it out the tangential chute in the mower housing. Close clearance between the inside diameter of the perforated baffle and the fan hub prevent air recirculation forcing all the material and air to go through the openings in the baffle. The annular chamber 36 with the cylindrical flange 34 confine the air flow to the outer periphery of the cylindrical chamber 28 to provide maximum fan efficiency.

The opening 48 in the plate 46 permits the cutting blade 32 to cut the grass, lift the material and suck it into the lower part of the housing. The high air velocity due to the small inlet area keeps the shredded material in suspension. The small particles that drop to the plate at the rear of the mower re-enter the air stream and pass through the perforated baffle 44 due to the suction from the fan in the top portion of the housing.

Referring again to FIG. 1 there is shown a vacuum device 56 comprising a nozzle 58, a diverging nozzle 60 removably connected to the front of the housing 12, and a flexible hose 62 operatively interconnecting the converging nozzle 58 and diverging nozzle 60.

Figure 8:
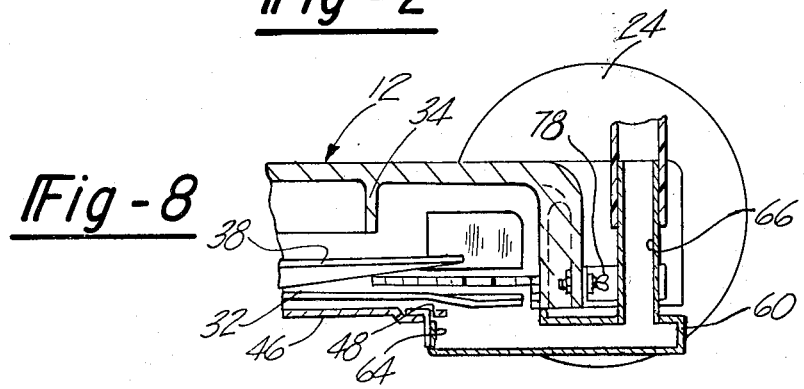
FIG. 8 is a sectional view of a vacuum device of the present invention installed on the lawn mower.

As can be best seen in FIGS. 1, 8 and 9, the diverging nozzle 60 comprises an inlet port 66 and an outlet opening 64. The outlet port 64 registers with the aperture 48. A sealing gasket, not shown, is preferably attached to the diverging nozzle 60 around the outlet opening 64 to seal the interface between the nozzle 60 the plate 46 and the front bottom edge of the circular wall 26. The nozzle 60 includes a pair of mounting flanges 70 which engage in appropriate slots 72 in the plate 46, and a mounting bracket 74 with holes 76 for receiving screws 78 which fasten to the front of the mower 10.

The vacuum device is used then with the plate 46 in position so that the fan 38 and the cutting blades 32 create a suction concentrated at the inlet portion 48. The device is for picking up leaves from areas such as shrubs inaccessible to a lawn mower. This attachment is intended to be used during the autumn along with the vegetation shredder when the leaves start to fall from the trees.

The mower can be used as a leaf blower in any combination that uses the fan 38 by omitting the catcher 20.

The equipment can be used as a vegetation chopper or as a snow blower by using the fan 38 and the cutting blade 32 only.

As the lawn mower 10 with the attachments shown in FIGS. 2, 3, and 4, traverses a lawn to be mowed or cleaned, the leading cutting edge 33 of cutting blade 32 cuts the grass of the lawn, and the upwardly extending trailing edge 35 of the blade 32 forces the cutting and other refuse upwardly into the cylindrical chamber 28 and into the fan 38. The baffle 40 which blocks the lower part of the opening 37 into the chute 14 prevents the cuttings and refuse from being immediately discharged from the chamber 28 and causes them to be circulated in the chamber 28 where they are exposed to the chopping blades 41 of the fan 38. The close spacing between the cutting blade 32, fan 38 and baffle 40 creates a shearing action on the cuttings as they pass between the blade 32 and the baffle 40 and between the baffle 40 and fan 38, thus further reducing them in size. Further, as the fan 38 rotates, the leading edge 43 of the chopping blades 41 further reduces the size of the cuttings and refuse. The vanes 45 of the chopping blades 41 create a current of air through the shredder which forcibly blows the reduced cutting and refuse out through the discharge chute 14.

As the lawn mower 10 with the attachments of FIGS. 5, 6 and 7, traverses a lawn to be mowed or cleaned, the leading cutting edge 33 of the blade 32 cuts the grass of the lawn, and the upwardly extending trailing edge 35 forces the cuttings and other refuse upwardly into the cylindrical chamber 28 forcing the cuttings through the holes in the screen 44. The close spacing between the blade 32 and screen 44, and between the screen 44 and fan 38 creates a shearing action on the cuttings and refuse as they pass from the area of the blade 32 to the chamber 28, thus further reducing the size of the particles. As the cuttings and refuse pass through the screen 44 they are exposed to the chopping blades 41 of the fan 38 and are thereby further reduced in size. As in the first mentioned embodiment, the vanes 45 of the chopping blades 41 effect a flow of air through the shredder. The restricted aperture 48 formed by the plate 46 increases the air velocity into the chamber 28. This increase in velocity together with the plate 46 prevents the cuttings and refuse being shredded from dropping out of the chamber 28.

The vacuum device 56 is connected to the mower 10 to extract leaves and other refuse from areas too small or restricted to reach with the mower 10, such as under shrubs. The suction created by the fan 38 and cutting blade 32 is transmitted to the nozzle 58 through the nozzle 60 and hose 62. The leaves and refuse are thus sucked into the nozzle 58, passed through the hose 62, in through the inlet port 66 and out through the outlet opening 64 of the diverging nozzle 60, through the aperture 48 in the plate 46 and into the chamber 28 wherein it is shredded by the blade 32 and fan 38 and ejected through the chute 14. Parts shown in FIG. 7 are used for this application.

I have found that the shredder attachments of the invention reduces the volume of leaves, for example, about 15 to 1 and, as compared to other mowers now available, increases the lawn area mowed before changing the collection bag by at least fourfold. This result is achieved by the improved suspension of particles in the air stream due to the high air velocity, increased air flow from the cutting and fan blades and the resulting more effective shearing action between the baffle and the blades.

I claim:

1. Lawn maintenance equipment comprising:
  a. a housing having a top wall, sidewalls, and a bottom inlet for air and vegetation;
  b. a power driven, generally vertically disposed shaft within said housing;
  c. a cutting blade rotatably mounted on said shaft to sweep a generally horizontal plane above said inlet;
  d. a chopper blade rotatably mounted on said shaft to sweep a generally horizontal plane above said cutting blade;
  e. a discharge port for comminuted vegetation; and
  f. means for effecting the flow of air from said inlet downstream to said port;
  the improvement which comprises:
  first baffle means positioned near said inlet and adapted to effect an increase in the rate of said air flow; and
  second baffle means positioned downstream from said first baffle means and extending generally horizontally between said two planes, said second baffle means adapted to effect an increase in the rate of said air flow.

2. The equipment as defined in claim 1 wherein said first baffle means extends generally horizontally between said cutting blade plane and said inlet.

3. The equipment as defined in claim 1 wherein said first baffle means is a plate covering a portion of the area of said inlet.

4. The equipment as defined in claim 1 wherein said second baffle means is an annular perforated plate wherein the perforations are of a size sufficient to accommodate the passage of vegetation particles therethrough.

5. The equipment as defined in claim 1, wherein said second baffle is positioned below said discharge port.

6. The equipment as defined in claim 1 and wherein said air flow effecting means produces torroidal air movement and said equipment additionally comprising a discharge chute secured to said housing to communicate with said port and positioned to be generally tangential to said torroidal air movement.

7. The equipment as defined in claim 1 wherein said second baffle means is spaced closely to said cutter blade and to said chopper blade in a manner to provide a shearing action on vegetation particles passing therethrough.

8. The equipment as defined in claim 1 and further comprising a vacuum attachment comprising:
  a. a fitting removably attached to said housing, said fitting having an inlet port and an outlet port, said outlet port being in registration with said inlet; and
  b. a vacuum hose operatively connected to said inlet port.

9. The lawn maintenance equipment as defined in claim 1 and in which said chopper blade, said first baffle means and said second baffle means are each individually removably mounted whereby said equipment can be used with just said cutting blade to provide a standard lawn mower, said equipment can be used with just said cutting blade and said chopping blade to provide a chopper or a snowblower, said equipment can be used with said cutting blade, said chopper blade and said first baffle disposed intermediate said cutting blade and said chopper blade to provide a leaf shredder and said equipment can be used with said cutting blade, said chopper blade, said first baffle means disposed intermediate said cutting blade and said chopper blade and said second baffle means disposed on the side of said cutting blade opposite said first baffle means to provide a fine shredder.

10. Lawn maintenance equipment comprising a housing having a front wall, a rear wall and a top wall, sidewalls, a bottom inlet for air and vegetation and a discharge chute disposed in the upper part of one of said walls, a power driven, generally vertically disposed shaft within said housing, a cutting blade mounted to said shaft in a horizontal plane disposed below said discharge chute, a fan blade fixed to said shaft above said cutting blade to rotate at the same speed as said cutting blade, a baffle mounted to said housing and extending from said front wall generally horizontally between said cutting blade and said fan blade, said baffle being adapted to effect an increase in the rate of air flow and to direct said air flow torroidally in said housing.

11. The lawn maintenance equipment as defined in claim 10 and including a plate mounted to said housing beneath said cutting blade, said plate being provided with an inlet opening.

12. Lawn maintenance equipment comprising: a housing having a top wall, sidewalls, and a bottom inlet for air and vegetation, said housing having a central cylindrical inner wall depending downwardly from said top wall to define a cylindrical chamber and an annular chamber between said cylindrical wall and said sidewalls, a shaft extending into said chamber, a fan mounted to said shaft, said fan having blades carried within said annular chamber, said annular chamber and said fan blades being dimensioned to provide relatively close clearance between said blades and the adjacent walls, a cutting blade mounted to said shaft below said fan.

13. The lawn maintenance equipment as defined in claim 12 including a discharge opening formed in said housing above said cutting blade and adjacent said fan.

14. The lawn maintenance equipment as defined in claim 13 and including a substantially semi-circular baffle removably mounted to said housing to extend horizontally between said cutting blade and said fan blades in position to prevent discharge from said cutting blade directly to said discharge chute.

15. The lawn maintenance equipment as defined in claim 12 and including an annular, perforated plate removably mounted to said housing to extend horizontally between said cutting blade and said fan blades.

16. The lawn maintenance equipment as defined in claim 15 and including a plate removably mounted to the bottom of said housing below said cutting blade, said plate having an opening to provide an inlet to said cutting blade.

17. The lawn maintenance equipment as defined in claim 16 and in which said cutting blade is mounted at an angle to the horizontal to rotate closer said plate in the area of said opening.

18. The lawn maintenance equipment as defined in claim 16 and including a vacuum attachment comprising:

a fitting removably attached to said housing, said fitting having an inlet port and an outlet port, said inlet port being in registration with the opening in said plate; and a vacuum hose operatively connected to said inlet port.

19. The lawn maintenance equipment as defined in claim 12 and including a plate removably mounted to the bottom of said housing below said cutting blade, said plate having an opening to provide an inlet to said cutting blade.

* * * * *